United States Patent Office 3,430,732
Patented Mar. 4, 1969

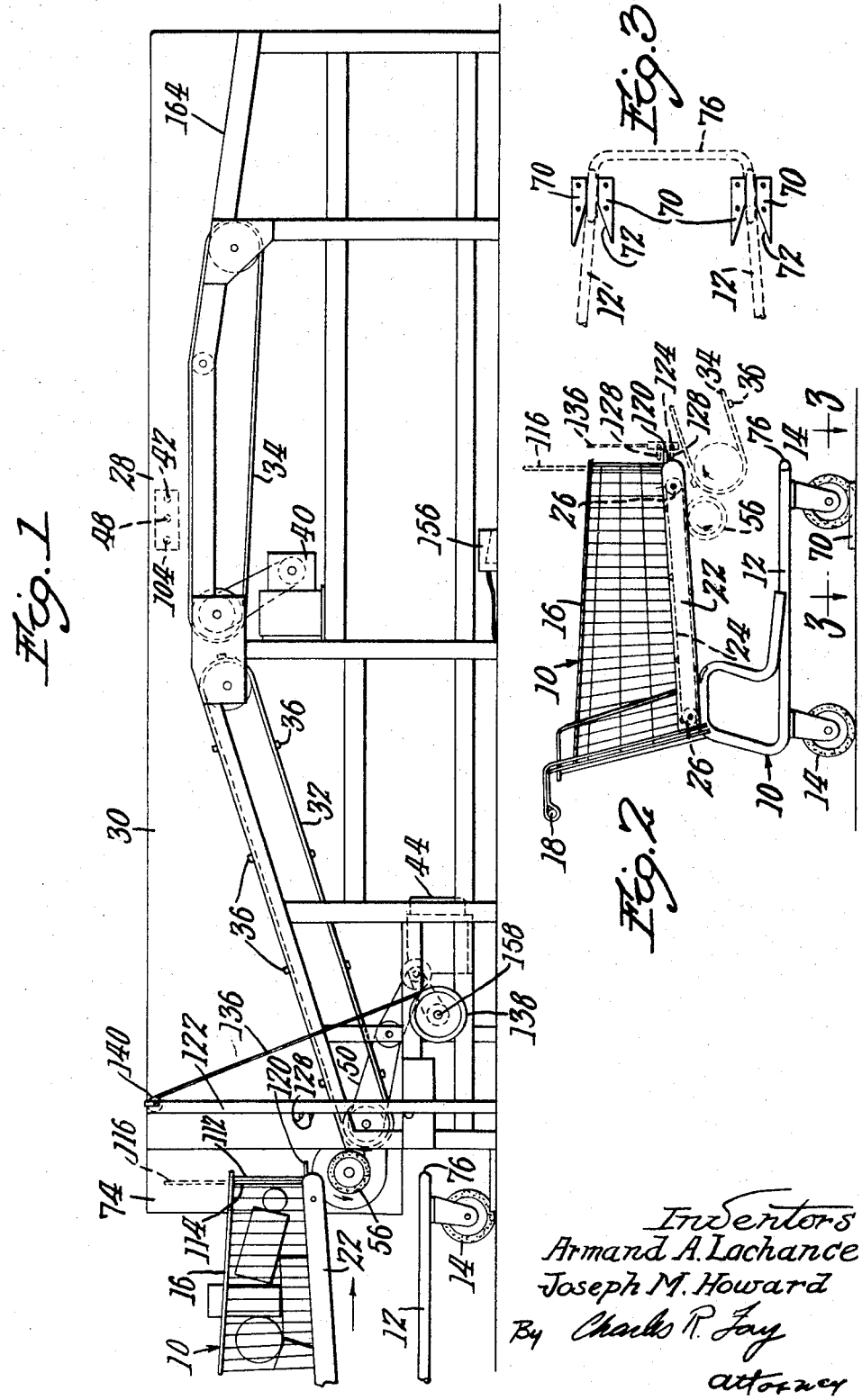

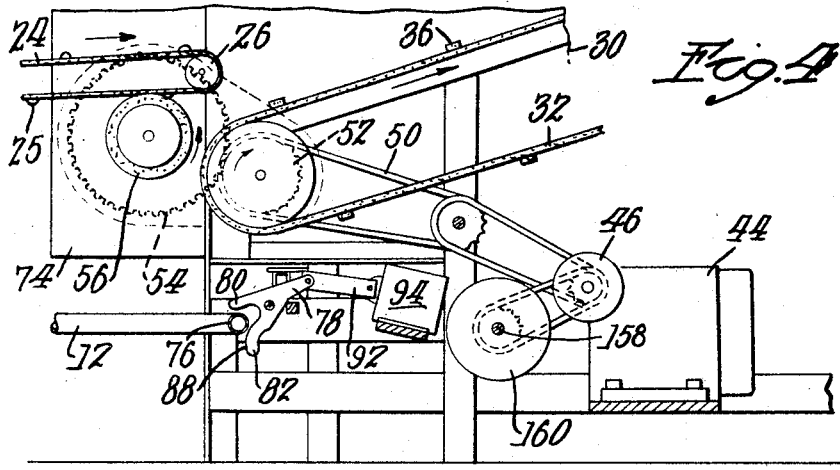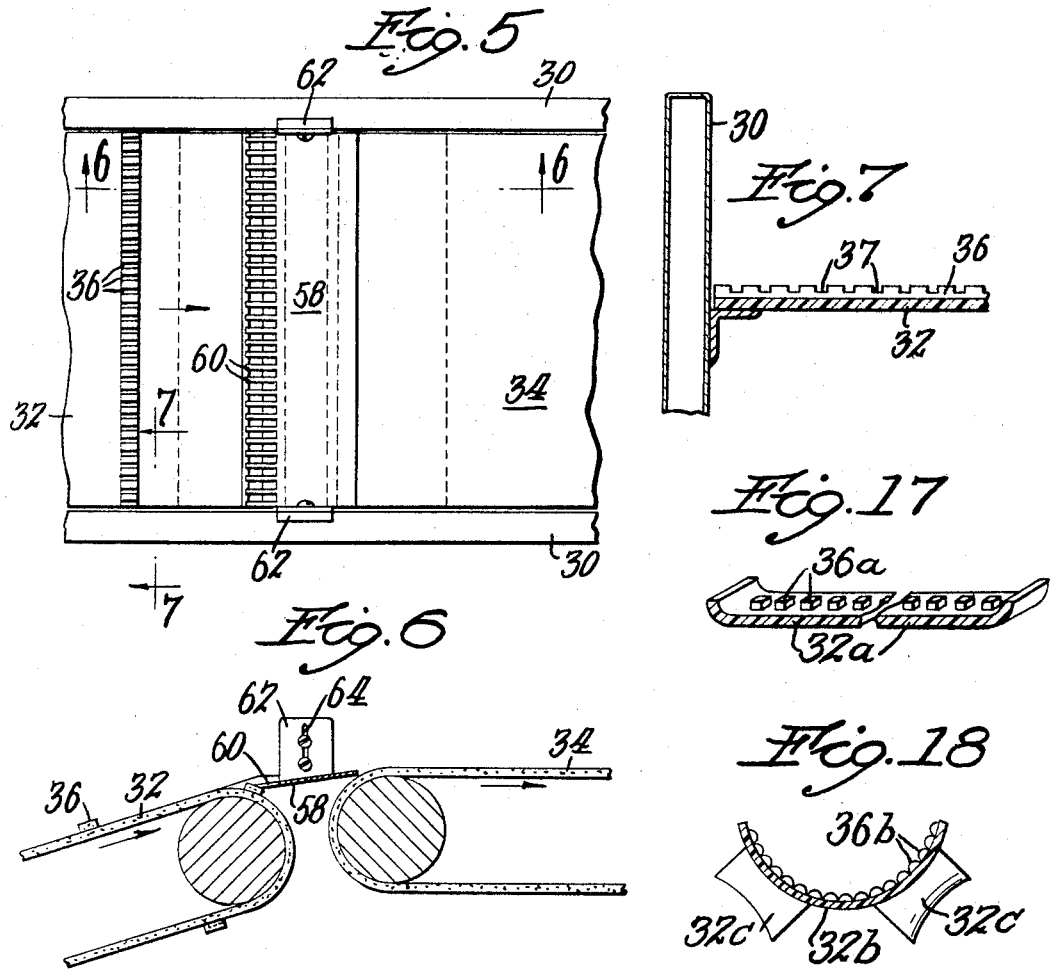

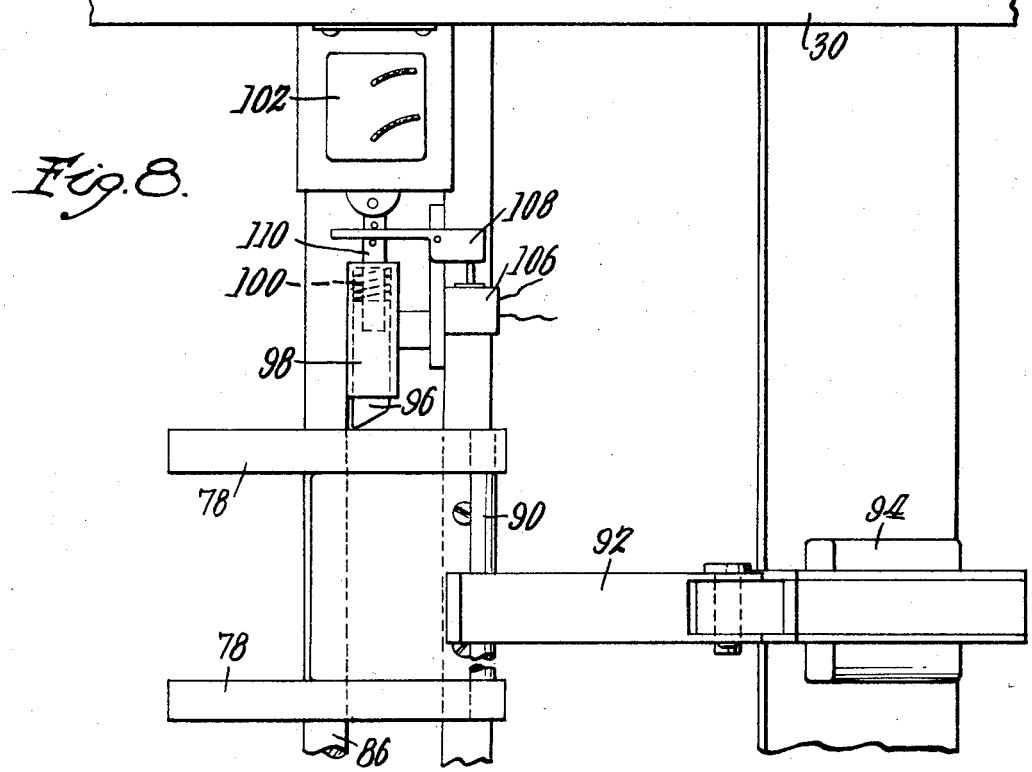
Fig. 8.
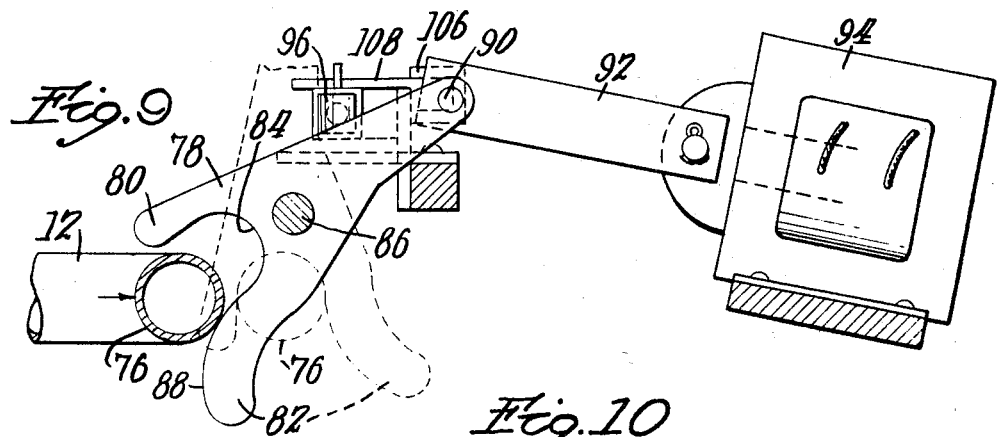
Fig. 9.
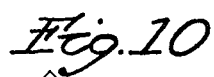
Fig. 10.
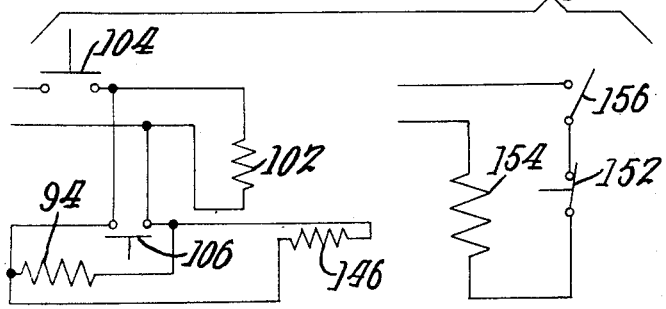

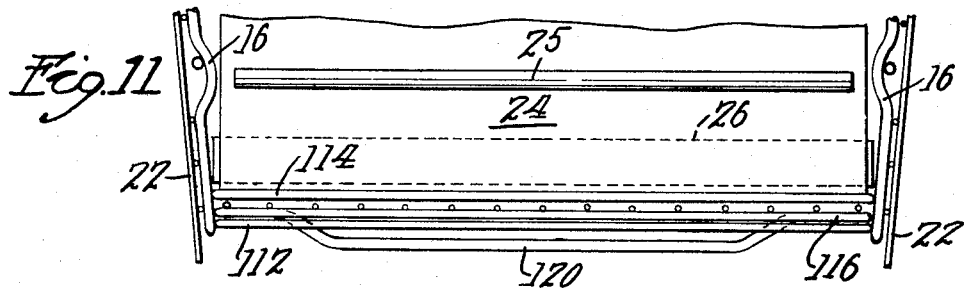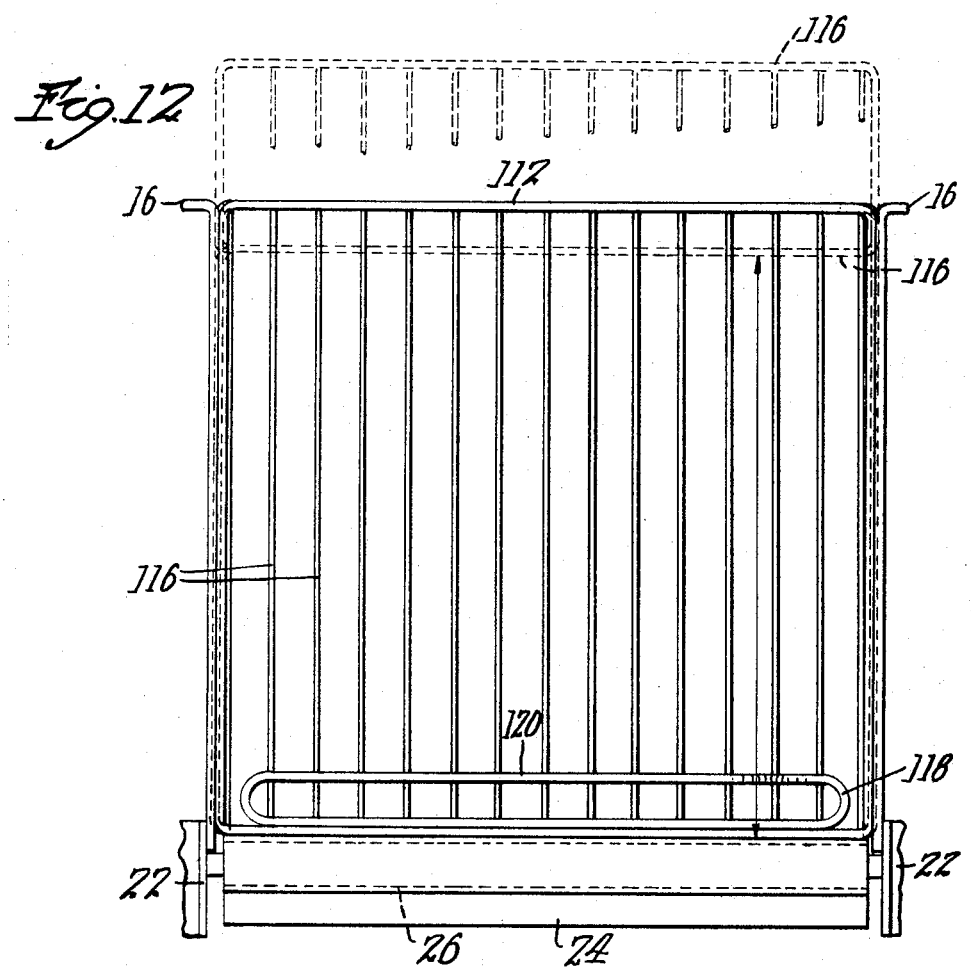

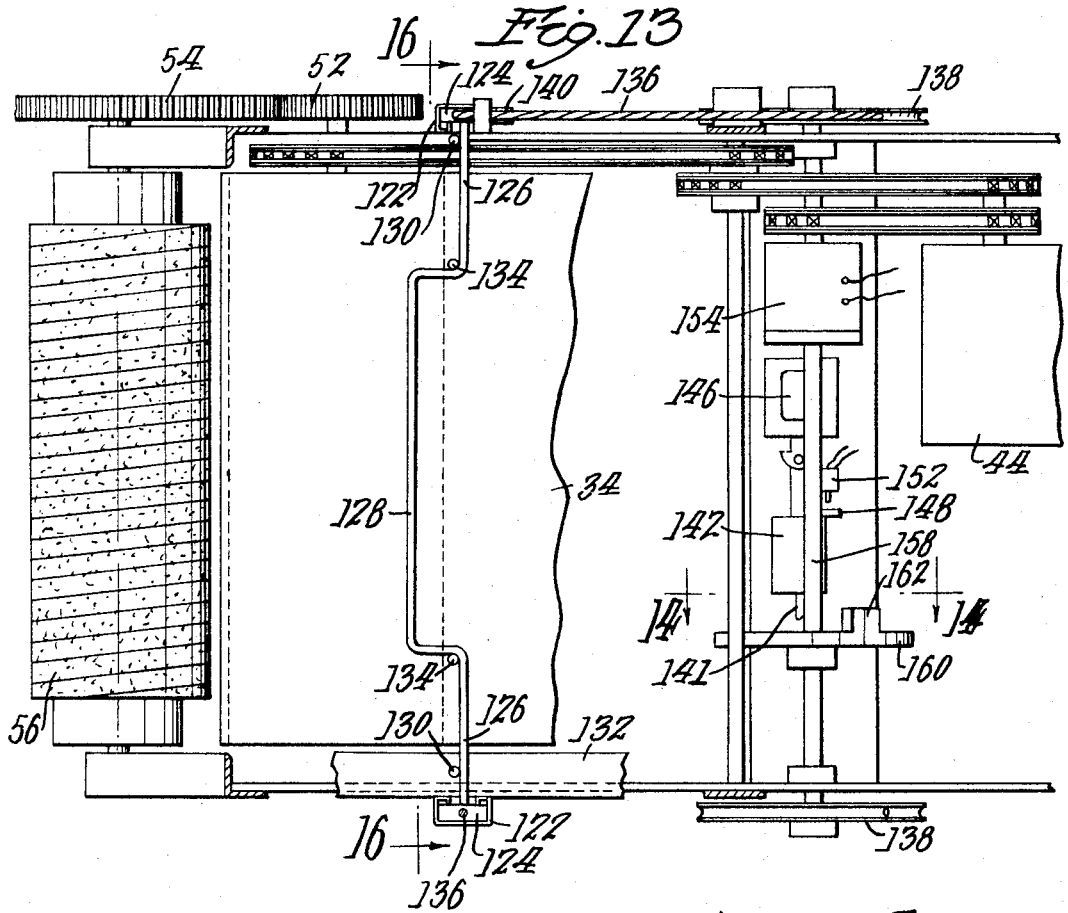
Fig. 13
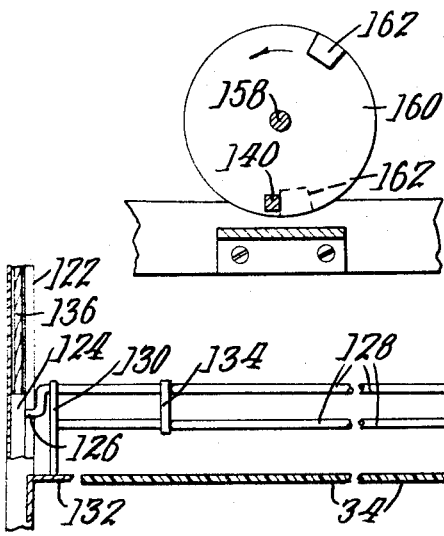
Fig. 14
Fig. 16
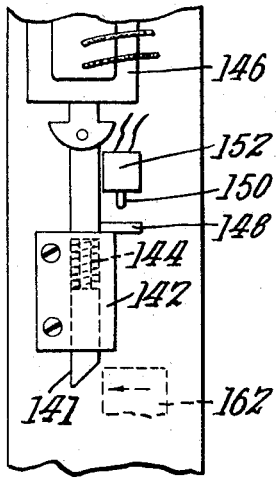
Fig. 15

3,430,732
AUTOMATIC GROCERY CART
Armand A. Lachance, c/o American Metal Products Co., Southbridge St., Auburn, Mass. 01501, and Joseph M. Howard, Worcester, Mass.; said Howard assignor to said Lachance
Continuation of application Ser. No. 478,860, Aug. 11, 1965. This application Sept. 25, 1967, Ser. No. 670,462
U.S. Cl. 186—1                                                      9 Claims
Int. Cl. A47f 10/00; B60p 1/38, 3/02

ABSTRACT OF THE DISCLOSURE

A nesting grocery cart having a swinging gate at the rear to receive the forward end of a succeeding similar cart and a movable gate at the front to clear the way for the motion of goods out of the cart in a forward direction, there being an endless belt forming a floor for the receptacle which upon being energized moves the goods, a checkout counter and power operated means to open the front gate, and a conveyor to bring the goods from the open gate to the checkout counter.

---

This application is a continuation of 478,860 filed Aug. 11, 1965, now abandoned.

This invention relates to nesting carts ordinarily used in retail stores and other places. Such carts in general are well known in the art and can be nested so as to achieve a storage thereof in a relatively small space but are easily detached to be pushed about the store as for instance in a supermarket by the shopper. After the shopper has selected the goods needed, he wheels the cart to a checkout stand where the goods are taken out of the cart and placed on the counter for the inspection of the cashier who rings up the sale.

The principal object of the present invention is the provision of a practical operative automatic dumping grocery cart which has a basket in which a conveyor forms a major portion of the bottom thereof and on which the goods normally rest when placed there by the customer, together with a front gate, in combination with another conveyor at the checkout stand under the control of the cashier, whereby when the car is properly positioned at the checkout stand, the front gate of the basket is opened and the goods are propelled out of the cart onto the checkout conveyor where they pass under the eye of the cashier for automatic delivery of said articles from the cart to the checkout cashier.

Other objects of the invention include the provision of certain mechanical devices which ensure that the cart is in a proper location relative to the checkout stand; means for properly latching the cart in immovable relationship with respect thereto; the provision of automatic means for opening the gate at the forward portion of the carriage, said means being under the control of the cashier; and simple and effective safety devices ensuring proper alignment of the cart and the stand and latching of the various parts to prevent accidental closing of the gate or removal of the cart from its operative position with respect to the stand when the conveyor in the bottom thereof is energized.

Another object of the invention resides in the provision of a cart as above described in which the carts, when not in position to deliver goods to the checkout counter, are quickly and easily nestable just as are ordinary carts of the prior art which do not have automatic merchandise delivery mechanism therein.

The invention further relates to arrangements and combinations of parts which will be hereinafter described and more particularly set forth in the appended claims.

Reference is to be had to the accompanying drawings in which:

FIG. 1 is a view in side elevation illustrating a cart approaching the position of merchandise discharge with respect to a checkout stand;

FIG. 2 shows the cart in the operative position;

FIG. 3 is a section on line 3—3 of FIG. 2 illustrating guide means for positioning the cart with respect to the checkout stand;

FIG. 4 is an enlarged view of the means for latching the cart in the operative position thereof;

FIG. 5 is an enlarged plan view illustrating the transfer apron from one conveyor to another;

FIG. 6 is a section on line 6—6 of FIG. 5;

FIG. 7 is a section on line 7—7 of FIG. 5;

FIG. 8 is a plan view of the cart latching mechanism;

FIG. 9 is a view in side elevation thereof;

FIG. 10 is a circuit diagram;

FIG. 11 is a plan view of the forward portion of the cart showing the movable front gate;

FIG. 12 is a front view thereof illustrating the lifting action of the gate;

FIG. 13 is a plan view on an enlarged scale showing the gate raising mechanism;

FIG. 14 is a section on line 14—14 of FIG. 13, and

FIG. 15 is a detail view of a latch for the gate;

FIG. 16 is a sectional view on line 16—16 of FIG. 13; and

FIGS. 17 and 18 are detail views partly in section illustrating modifications of the belt construction at the platform.

Referring now to FIGS. 1 and 2, the cart is generally indicated by the reference numeral 10. This cart in many respects is more or less conventional. It is provided with a generally horizontal running frame at 12 which is mounted on wheels 14. Frame 12 is sometimes used to support large bundles. On the frame 12 there are uprights mounting a basket usually of wire indicated at 16. This basket is ordinarily provided with some kind of pusher handle 18 and a swinging rear gate by which means it is nested with other similar carts, it being noted that the frame 12 and basket 16 taper and the carts are nestable.

In the present case the basket is provided with side guard plates 22 which are relatively elongated and narrow being fastened to the lower portion of the basket in any desired way. These guard plates 22 embrace and guard an endless conveyor 24 which is trained over pulleys or the like 26 at each end of the basket. This conveyor forms the bottom of the basket and the goods selected by the shopper are piled on this belt as is indicated in FIG. 1.

The checkout stand is generally indicated by the reference numeral 28. It embodies relatively high walls 30, 30. In FIG. 1 only one of these walls is shown as the wall adjacent the observer has been removed in order to show the apparatus, but both walls are shown in FIG. 5, and the wall not shown in FIG. 1 is shown in FIG. 7. These walls form side wall enclosures for a pair of end-to-end endless belts 32, 34.

Belt 32 is located on an incline as shown in FIG. 1. It is provided with cleats 36 and it receives the goods from the cart elevating them to the position of the conveyor 34 where the cashier conveniently stands in front of the cash register. The cleats 36 are conveniently made of plastic and are serrated or notched as shown at 37 in FIG. 7, and being relatively low do not interfere with the goods but on the other hand cause them to continue to be elevated even though the goods may be in the form of cylindrical cans or the like.

As shown in FIGS. 17 and 18, the cleats 36 might assume divided finger-like members 36a on belt 32a which is the equivalent of belt 32, and the same may have raised edges. Also as in FIG. 18, the belt 32b may have projections 36b thereon for traveling goods, this belt having a concave configuration guided by dished rollers 32c.

A motor as at 40 is utilized to drive the conveyor 34 under the control of an on-and-off switch 42 under direct control of the cashier. As shown in FIG. 1, the switch 42 and another pair of switches with it are behind wall 30 out of sight of the customer and controllable only by the cashier.

A motor indicated at 44, see FIG. 4, operates the other conveyor 32 and a speed reducer at 46 is utilized for this purpose. This motor 44 is controlled by the switch 48 located with switch 42 so that the operator controls both conveyors.

A belt at 50 is utilized to rotate a wheel or gear 52 and is meshed with another gear or wheel 54 which drives a rubber covered roller 56. The roller 56 is located on an axis transverse of the apparatus here described and is also transversely arranged with respect to the cart when the cart is in the position shown. It will be seen in FIG. 4 that when this rubber covered roller 56 is in contact with the lower run of the belt 24 in the cart it will cause the same to be driven in the direction of the arrows in FIG. 4 to carry the goods in the cart off of the conveyor 24 onto conveyor 32. Belt 24 has cleats 25 placed at intervals to assist goods to move. This operation is of course under complete control of the cashier who does not start the operation until assured that the cart is in the correct position and latched as will be described and that the front gate of the cart is in open position also as will be described.

A transfer apron of spring steel is indicated at 58, see particularly FIG. 6, and is provided with rearwardly projecting fingers at 60 which facilitate the transfer of the goods from the conveyor 32 to the conveyor 34. The plate 58 is conveniently adjustably mounted on a pair of side brackets 62 having a vertical slot in each as at 64 and held in position by common screws or bolts. This plate 58 is also provided to prevent injury.

As shown in FIG. 3 the carriage wheels are guided into position by means of V-shaped guide means 70. The guides 70 are provided with open angular ends as at 72 so that if the customer is even approximately correct in his alignment of the cart with the apparatus between the ends of the walls as at 74, the guides 70 automatically cause the wheels to be located in correct position.

The grocery cart of the prior art is provided with a transverse bar 76 at the forward end of the running frame here indicated at 12, and this bar or equivalent is utilized herein to be latched in the operative position so that the cart cannot be backed off by the customer during the loading operation or until allowed by the cashier. There are provided a pair of hook-like members generally indicated at 78, 79 which include a relatively short top finger 80 and a relatively long curved bottom finger 82 providing a bight 84 between them. These members are pivoted on a rod 86 between the solid line position of FIG. 9 and the dotted line position thereof, and this action is simply caused by the customer pushing the cart into the position so that the cross bar 76 bears on the curved top edges 88 of fingers 82 pushing them down and toward the dotted line position so that the fingers 80 come down in back of the bar 76, locking it in position.

The hook members 78 are rigidly connected together by a bar 90 which is offset with relation to the axis of the rod 86 and to the bar 90 there is secured a link 92 in turn connected to the core of a solenoid 94 of generally conventional design. When this solenoid is actuated it moves to the right in FIG. 9 and causes the hook members 78 to pivot in a clockwise direction. The transverse bar 76 of the running gear 12 of the carriage is not only released, since the hooks move from the dotted line position to the solid line released position, but also the curved edges 88 of the lower fingers 82 cause the carriage to be moved backwardly out of the range of the latch, so that it is clear and then easily moved to a position where the various carts can be nested in a row as is conventional.

However in order to provide for holding the hook members 78 in the dotted line latching condition of FIG. 9, there is provided a bolt generally indicated at 96. This bolt is rectilinearly movable in a housing 98 and is spring pressed toward the members 78 by a spring 100. This bolt is movable in the other direction by a solenoid 102 and the solenoids 94 and 102 are both controlled by means of switch 104 in the same panel with switches 42 and 48, see FIG. 1. This action is not quite simultaneous as solenoid 102 operates to unlatch the hook 78 before the same can be moved as described above and this is accomplished by means of a normally open switch at 106 in FIG. 8 which is controlled by a pivot finger 108. The pivot switch finger 108 has a connection with the bar 110 which connects bolt 96 with the core of a solenoid 102, and when this is retracted, i.e., moves upwardly in FIG. 2, the switch 106 is closed, thus energizing solenoid 94.

Referring now to FIGS. 11 to 15 inclusive there is shown the manner in which the front gate of the carriage is opened. The gate construction is perhaps best seen in FIGS. 11, 12 and 15. At the front portion of the carriage between the forward end portions of guard plates 22 and the forward end of the wire basket 16, there are provided two open, spaced rectangular frames 112 and 114. The rectangular frame 114 is directly behind frame 112 as seen in FIG. 12, and the two frames are welded or otherwise secured to the forward portions of the wires forming the sides of wire basket 16. These basket sides are fixed.

The gate is indicated at 116 and this is a rectangular wire member including a series of upright wires as shown in FIG. 12 to maintain the merchandise in the cart except when the gate is raised as indicated in dotted lines in FIGS. 1, 2 and 12.

At the lower portion of the gate 116 there is provided a flattened, horizontal loop of wire generally indicated at 118. Essentially this loop has an upper forwardly offset portion 120 which is fixed in relation to the upright wire members of the gate 116 and this is shown in FIGS. 1, 2, 11 and 12.

At either side of conveyor 34 at the forward end thereof there is provided an upright post 122. These posts are in the form of facing channels or the like and have bearing blocks 124 slidably mounted therein. On these blocks are mounted the ends 126 of a cross wire member having an offset jog 128, see FIG. 13, and preferably there are provided a pair of these members as is shown in FIG. 16 in vertically spaced relation, these being connected together as by stop means 130. In the lowermost position of the cross wire member 126 and 128, it is stopped on spaced plates 132, 132 as shown in FIG. 16, the belt 34 extending between these two stop plates. Other connection means such as shown at 134, 134 may also be used to maintain the wires 126 and 128 in spaced relationship as shown in FIG. 16.

Each sliding block 124 is connected by means of a cable or the like 136 to pass over a winding drum or the like 138. When these drums are rotated in a clockwise direction, see FIG. 1, they wind the cables 136, which are trained over pulleys 140 at the top of the posts 122, this action raising the wire member 126, 128. The projection 120 of the wire member 118 on the gate 116 is located between these members as shown in FIG. 2, thus the gate must rise as shown in dotted lines in FIGS. 1 and 2.

The gate however must be held in this elevated position while the transfer of articles is taking place from the carriage to the conveyor 34 and this is accomplished by a bolt 141 which is somewhat similar to that shown in FIG. 8. It has a rectilinear motion in a case 142 and is normally projected outwardly by a spring 144 to the position shown in FIG. 15, but it is retractable by means of a solenoid 146. When this happens, a stop plate 148 strikes the actuator 150 of a normally closed switch 152 to interdict the action of a magnetic clutch 154.

The motor at 44 drives one element of magnetic clutch 154 but only when the magnetic clutch is electrically energized. The other element of the magnetic clutch rotates a shaft 158 on which is a wheel 160. Wheel 160 has a single tooth 162.

When the magnetic clutch is energized by the cashier utilizing a foot switch 156, see FIG. 1, the front gate of the basket rises as above described and at the same time the clutch is energized and the shaft 158 rotates wheel 160 approximately from the solid line position of the tooth 162 in FIG. 14 to the dotted line position thereof. In this position it pushes past the bolt 141 which snaps behind it holding against reverse motion. At this point the gate of the basket of the cart is in its raised position and is thus held by the bolt until the bolt is retracted by operation of the solenoid. When this happens the stop 148 actuates the switch 152 to open it and this deenergizes the magnetic clutch which allows the wheel 160 to reverse and the gate then descends by gravity to the stopped position thereof as shown in FIG. 16.

OPERATION

When the customer has selected the goods he desires, he wheels the carriage to the FIG. 1 position. The side guiding plates 22 at least roughly position the same between the sides 74 of the walls 30 and then the guide plates 70 receive the wheels and exactly position the same so that when the cart is pushed forwardly to its fullest extent and strikes the finger 72 of the hook member 78, the cart is in the position desired for smooth operation of the transfer of the merchandise to the belt 34. The cart is locked by bolt 96 until such time as the solenoid 94 is actuated to retract it. The cashier steps on the switch 156 raising the gate of the carriage as above described by means of the cables 136, and bolt 141 then latches the gate in its uppermost position. At this point the operator then actuates the respective conveyor switch for conveyor 34 and roll 56 so that the cart conveyor at 24 starts to transfer the articles onto the cleated belt 34 which raises them and transfers them over the apron at 58 to the belt at 34. It is preferable to control the belts 32 and 34 independently so that even though some of the articles may be rising on belt 32 but have not reached belt 34, the cashier can be checking out articles on belt 34. Conversely the cashier can run the articles on belt 34 along to the downwardly extending chute 164 where they can be wrapped or boxed and at the same time belt 32 can be stopped if it is overloaded.

As soon as the goods have all been checked out, the operator unhooks the basket and allows the gate of the cart to drop by actuation of switch 104 releasing bolt 140 as well as bolt 96. When bolt 96 starts to retract, so also does the bolt 141 releasing the gate which falls, and as soon as the bolt 96 is fully retracted and the gate has fallen, solenoid 94 is actuated to push the cart out of the unloading position.

Having thus described our invention and the advantages thereof, we do not wish to be limited to the details herein disclosed, otherwise than as set forth in the claims, but what we claim is:

1. A manually movable nesting cart for the collection and transportation of goods to a delivery platform, said cart comprising a wheeled receptacle having tapering sides, a swinging gate at the rear of the receptacle and a movable gate at the front of the receptacle, said front gate being movable to clear the way for expression of goods out of the cart in a forward direction, an endless belt forming a floor for the receptacle, means guiding the front gate in its motion, means to drive the belt, and power-operated means moving the front gate to open condition, said gate moving means being located at the platform and being normally completely separate from the cart, and a detachable interengaging connection between the gate moving means and the gate.

2. The nesting cart of claim 1 including means under control of an operator to stop and start the power operated means.

3. A movable nestable cart for collecting and transporting goods to a fixed delivery platform having a rotatable driven member on it, means to actuate the latter, said cart comprising a wheeled tapered receptacle having sides and back, and a front gate that is movable for opening the front of the receptacle, an endless belt forming a floor for said receptacle, said belt being rotated by said rotatable driven member in a direction to move goods in the receptacle out through the open front thereof when said gate is in open condition, said gate being normally located in receptacle-closing condition, and including movable means on the platform for moving the gate to open condition, the gate opening means and the rotatable member being separate from the cart.

4. The nestable cart of claim 3 including control means for said member actuating means located adjacent the platform.

5. A movable cart including a wheeled frame, a basket on the frame, said basket comprising side walls, a hinged rear gate and a movable forward gate, a movable member forming the bottom of said basket and being effective to move goods through the forward end thereof when the movable gate is open, movable means to open the gate, means to lock said gate opening means with the gate in open position, and means for releasing the said locking means, the gate opening means being positioned in a fixed location and being separate from the cart.

6. The cart recited in claim 5 including a delivery station, means latching the cart in operative position with respect to the delivery station, and means under the control of an operator at the delivery station for releasing said latch.

7. The cart recited in claim 5 including a delivery station, means latching the cart in operative position with respect to the delivery station, and means under the control of an operator at the delivery station for releasing said latch and said locking means.

8. A cart comprising side walls, front and rear walls and an endless belt forming the bottom thereof, a delivery station, means at said delivery station for driving said belt in a direction to move the goods out of the receptacle, and a latch for latching said cart in operative position with respect to said means, said latch comprising a movable member adapted to be contacted by a portion of said cart and moved to latching position thereof, means holding said movable member in latched condition, and means under the control of the operator to release the movable member, the last-named means including power operating means moving the movable member in a direction opposite to the motion thereof caused by the portion of the cart and including a part bearing on the said cart and moving the latter out of latched position.

9. A manually movable cart including a wheeled frame, a basket on the frame, said basket comprising a bottom, side walls and end walls, at least one end wall including an openable gate,
  said bottom being constructed and arranged to cause articles to move through the gate when the gate is in open condition,
  the gate being normally closed and preventing the articles from moving,
  means to open the gate, means to hold the gate open while the articles move out of the cart, means to release the gate to return to closed position,
  the gate opening means being positioned at a fixed location, and being separate from the cart,
  a checkout counter at a level above the level of the bottom of the cart, a conveyor separate from the cart, said conveyor being located at a fixed station and receiving articles from the cart, and control means for actuating the conveyor at any time that the articles are being moved through the gate, said conveyor being on an incline to raise the articles from the level thereof in the cart to said checkout counter.

References Cited
UNITED STATES PATENTS

| | | |
|---|---|---|
| 1,650,053 | 11/1927 | Straight. |
| 1,779,720 | 10/1930 | Wood. |
| 2,406,992 | 9/1946 | Butler _____ 214—44 |
| 2,668,629 | 2/1954 | Dahlman. |
| 2,788,927 | 4/1957 | Hoffstetter. |
| 2,896,773 | 7/1959 | Syce. |
| 3,021,795 | 2/1962 | Hayba et al. |
| 3,036,722 | 5/1962 | Sharaway. |
| 3,115,975 | 12/1963 | Thompson. |

ROBERT G. SHERIDAN, *Primary Examiner.*

U.S. Cl. X.R.

214—46, 83.18